(12) United States Patent
Mamish et al.

(10) Patent No.: US 6,355,344 B1
(45) Date of Patent: Mar. 12, 2002

(54) NON-FOGGING PRESSURE SENSITIVE ADHESIVE FILM MATERIAL

(75) Inventors: Abboud L. Mamish, Natick; Paul S. Goldsmith, Wayland; Serra M. Jerry, Chelmsford, all of MA (US)

(73) Assignee: Tyco Adhesives LP, Norwood, MA (US)

( * ) Notice: Subject to any disclaimer, the term of this patent is extended or adjusted under 35 U.S.C. 154(b) by 0 days.

(21) Appl. No.: 09/316,590

(22) Filed: May 21, 1999

(51) Int. Cl.[7] ............................. C09V 7/02; B32B 7/12
(52) U.S. Cl. ............. 428/343; 428/354; 428/355 AC; 428/921; 442/151
(58) Field of Search ..................... 428/343, 354, 428/355 AC, 921; 442/151

(56) References Cited

U.S. PATENT DOCUMENTS

| | | | |
|---|---|---|---|
| 4,992,331 A | * 2/1991 | De Coste, Jr. | 428/354 |
| 5,681,654 A | 10/1997 | Mamish et al. | 428/354 |
| 5,705,556 A | 1/1998 | Dijauw et al. | |
| 5,739,200 A | * 4/1998 | Cheung et al. | 524/504 |
| 5,755,912 A | 5/1998 | Ingwersen | |
| 5,807,450 A | 9/1998 | Takahashi | |
| 5,829,129 A | 11/1998 | Ito | |
| 5,830,545 A | 11/1998 | Frisk | |
| 5,846,651 A | 12/1998 | Nakai et al. | |

FOREIGN PATENT DOCUMENTS

| | | |
|---|---|---|
| EP | 0 257 984 | 8/1987 |
| EP | 0301764 A2 | 7/1988 |
| WO | WO 9306183 | 9/1992 |
| WO | WO 9705206 | 7/1996 |
| WO | WO/97/21778 | 6/1997 |
| WO | WO/98/00424 | 1/1998 |
| WO | WO/98/10014 | 3/1998 |
| WO | WO/98/10015 | 3/1998 |
| WO | WO/98/36026 | 8/1998 |
| WO | WO/98/58032 | 12/1998 |
| WO | WO/99/00449 | 1/1999 |
| WO | WO 9946348 | 1/1999 |

OTHER PUBLICATIONS

International Search Report in PCT/US00/13739.
*A New Generation of Materials for the Calendering Industry*, Teresa P. Karjala et al, The Dow Chemical Company, Polyolefins & INSITE™ Technology R&D, pp. 2139–2143.
Dow News, Product/Business News, *Dow Introduces New Material Made Possible By INSITE Technology—INDEX Intropolymers*, Dec. 11, 1998.

\* cited by examiner

Primary Examiner—Daniel Zirker

(57) ABSTRACT

Flexible, conformable, pressure sensitive adhesive film material has a plastic film and a compatible pressure sensitive adhesive layer on at least a first surface of the plastic film. The plastic film is formulated of plastic film polymers and optional additives. The plastic film polymers include, at least, thermoplastic ethylene/styrene interpolymer in major part, and a temperature modifier polymer, which increases the thermal resistance of the plastic film. The pressure sensitive adhesive layer is compatible with the plastic film, such as acrylic-based adhesive and shear-coated rubber-based adhesive. The PSA film material can be harness tape for use in wire harness constructions and can provide advantageously low fogging and good recyclability, along with performance characteristics suitable to stringent harness tape and other end-use applications. In certain embodiments, a plastic barrier layer is coextruded with the plastic film, and a surface of the plastic film opposite the adhesive layer.

22 Claims, 1 Drawing Sheet

NON-FOGGING PRESSURE SENSITIVE ADHESIVE FILM MATERIAL

INTRODUCTION

The present invention is directed to pressure sensitive adhesive film material suitable for use, for example, as pressure sensitive adhesive tape and the like. In particular, the present invention is directed to pressure sensitive film material which causes substantially less fogging of adjacent surfaces, such as glass surfaces, due to outgassing of materials, such as plasticizers and the like.

BACKGROUND

Pressure sensitive adhesive tapes are well-known for use in diverse applications. Typically, PSA tapes employ a backing film or web, such as a plastic film, to carry a layer of pressure sensitive adhesive. Among the numerous use applications well-known for PSA tapes are electrical tape and harness tape, that is, tape used for securing bundles of wires in wire harness fabrication. Existing PSA tapes have various shortcomings, especially PSA tapes employing a flexible polyvinyl chloride (PVC) backing web. PVC materials are difficult to recycle, due in part to their halogen content, and due in part to poor stability during processing since Hydrochloric acid is a byproduct of the decomposition of this polymer. In addition, PVC films typically employ significant quantities of plasticizers to achieve adequate conformability and other performance characteristics. The plasticizer content of PVC film is problematic in many use applications, due in part to its outgassing over time, especially at elevated temperatures. Not only can such plasticizer outgassing degrade the properties of the PSA tape, this process also can result in fogging of adjacent surfaces. The outgassed plasticizer condenses on adjacent surfaces causing a fog or haze on the surface. Notably, PVC adhesive tapes employed in wiring harnesses used in the passenger compartment of motor vehicles, such as in the dashboard, are a significant cause of windshield fogging.

Notwithstanding these longstanding shortcomings, PSA tapes employing PVC backing films have not easily been replaced. Numerous performance characteristics must be met by any replacement PSA tapes. Particularly for use as harness tape, a PSA tape must demonstrate good use characteristics, such as good conformability, with stress relaxation and dead fold properties, as well as hand tearability. In addition, any such replacement PSA tape must have good long-term heat aging in view of the extended product life for a motor vehicle wire harness, and especially in view of the temperature cycling which occurs within a motor vehicle passenger compartment or, even more so, within a motor vehicle engine compartment. In addition, PSA tape intended for use as harness tape typically is supplied in rolls, and must unwind from the roll without ratcheting and without requiring excessive force since, frequently, they are applied by hand. Further, it is highly desirable that any such alternative to the known PVC tapes should have a laterally-across straight edge tear by hand. That is, a person applying the tape should be able to easily rip the tape from the remaining roll at 90 to the longitudinal direction of the tape with substantially no curl or jaggedness at the newly-formed free end of the tape. Similarly, the force required to cross-rip the tape by hand must not be excessive, yet the tape must exhibit strength adequate to its intended application. Of course, the tape must also have a suitable adhesiveness level. Thus, the backing film or web must be compatible with a suitable adhesive which when combined with the backing web provides the aforesaid performance characteristics. Compatibility of the adhesive and the backing web is required to ensure the integrity of the interfacial bond between the backing web and the adhesive, while avoiding problems such as "blocking" of the adhesive tape roll. Moreover, the backing web and the compatible adhesive desirably would be employed with existing, commercially known manufacturing equipment and techniques for producing PSA tape. Better PVC alternatives are needed for pressure-sensitive adhesive tapes and other PSA film materials, having performance characteristics meeting most or all of these industry criteria. Large end users of PSA tapes and other PSA film materials, such as the motor vehicle industry, have long desired new materials which demonstrate less fogging and yet meet the other stringent performance characteristics required of the particular use application. While innumerable polymer materials are known which might be formed into films or webs for use in adhesive tape applications, efforts to identify a suitable alternative to PVC films for pressure sensitive adhesive materials have encountered difficulties either in the performance of the film material itself, its compatibility with a suitable adhesive, or both.

It is an object of the present invention to provide flexible, conformable, pressure-sensitive adhesive film material which exhibits low or insignificant fogging. It is a particular object of at least certain preferred embodiments of the invention to provide PSA tape and other PSA film material suitable to serve as an alternative to known PVC adhesive tapes in diverse application including, for example, as harness tape for passenger compartment and engine compartment wire harnesses for motor vehicles and similar applications. Additional objects and advantages of the present invention will be more fully understood from the following disclosure and detailed description of the invention.

SUMMARY

Selection and development efforts have now lead to a new class of pressure sensitive adhesive tapes and other flexible, conformable PSA film materials having excellent performance characteristics. The PSA film materials disclosed here do not require PVC backing films and, therefore, can achieve substantially reduced fogging. Various embodiments of the invention are suitable for use as electrical tapes, binding tapes, etc., and numerous use applications will be apparent to those skilled in the art given the benefit of the following disclosure and detailed description. Notably, certain preferred embodiments of the new PSA film materials disclosed here, that is, preferred versions employing certain advantageous combinations of materials, layer thicknesses, etc., are found to provide excellent performance characteristics for use as wire harness wrapping tape, especially as harness tape for motor vehicle passenger compartment and engine compartment applications.

In particular, pressure-sensitive adhesive film material disclosed here, as roll tape or in other forms, are found to have performance characteristics suitable for numerous applications presently served by PSA materials employing polyvinyl chloride backing films. The PSA tapes and other materials disclosed here, in particular, can be formulated to have excellent conformability, with good stress relaxation and dead fold properties, as well as good hand even after extended storage or exposure in a use application. They also have good temperature stability for meeting long-term heat aging requirements. Formulated for harness tape applications, the PSA tapes of the present invention have excellent cross-rip properties, including laterally-across straight edge tear by hand. In that regard, cross-rip forces for such preferred harness tape embodiments can meet specified ranges appropriate for hand application of the tape. Also, the unwind forces of such preferred harness tape embodiments can meet ranges specified for hand application of the tape, with little or no ratcheting or blocking of the tape rolls. These advantageous performance characteristics have been obtained by identifying the compatibility of suitable adhesives with suitable plastic backing films and other required ingredients or components. The PSA film materials of the invention do not require PVC backing films and, hence, can be more readily recycled. Moreover, harness wrap tape in accordance with numerous and preferred embodiments of the invention can be produced using manufacturing equipment and methods which are in current commercial use, thereby providing significant advantage over any other alternative to PVC which would require development and investment in new manufacturing equipment and methods.

In accordance with one aspect, pressure sensitive adhesive film material comprises, in combination, a flexible, conformable plastic film formulated of plastic film polymers and optionally comprising additives, and a pressure sensitive adhesive layer on at least one surface of the plastic film, which is compatible with the plastic film. The plastic film preferable is less than about 8 mils thick and "rollable", i.e., readily wound into rolls. The plastic film polymers include at least thermoplastic ethylene/styrene interpolymer in major part and a temperature modifier polymer which can also be referred to as a temperature/tensile modifier polymer, for increasing the thermal resistance of the plastic film and improving its tensile properties. More specifically, the temperature modifier polymer increases the thermal resistance of the plastic film above the level of thermal resistance which the thermoplastic ethylene/styrene interpolymer would achieve without the modifier polymer. It has been found that preferred embodiments of such pressure-sensitive adhesive film materials, especially prepared as harness tape, have good flexibility, conformability, flame-retardency sufficient to be self-extinguishing (per ASTM D-1000), and performance characteristics including at least the following: Fogging Number (per SAE J1756-94) of at least 60; long term heat aging (per Ford ES-XU5T-1A303-AA, section 6.1 and 6.3 of at least 3000 hr at 85° C.; unwind force (from a roll of the film material per ASTM D-1000 Method A or comparable test method) of from 15 to 60 ounces/inch, more preferably 25 to 50 ounces/inch; and adhesion to steel (per ASTM D-1000) of 25 to 65 ounces/inch. In accordance with preferred embodiments, the temperature modifier polymer of the plastic film is thermoplastic polyolefin. Suitable thermoplastic polyolefins include, for example, low-density polyethylene, high-density polyethylene, polypropylene, and polypropylene-modified rubber. Polypropylene-modified rubber is most preferred in view of the excellent temperature stability it provides to the pressure-sensitive adhesive tape or other film material, for meeting long-term heat aging requirements and for its softness and contribution to the conformability of the tape. As discussed further below, the pressure-sensitive adhesive layer of the PSA materials disclosed here preferably comprises predominantly acrylic based, isoprene based, natural rubber based, or butyl based adhesive compatible with the plastic film.

In accordance with another aspect, flexible, conformable, pressure sensitive film material comprises, in combination, a flexible, conformable plastic film formulated as described above, along with a pressure sensitive adhesive on one side of the plastic film, which is compatible therewith, and a plastic barrier layer. In accordance with preferred embodiments, the plastic film is an extruded film and the plastic barrier layer is coextruded with the plastic film. The plastic barrier layer typically is coextruded at a second surface of the plastic film opposite the first surface carrying the adhesive. Preferably, the plastic barrier layer is formulated of plastic film polymers comprising at least polyolefins or other ethylene/styrene interpolymers in major part. Optionally, the plastic barrier layer further comprises various additives, as further discussed below.

As noted above, discovery of the compatibility of suitable PSA adhesives with halogen-free plastic film formulated as disclosed above, has now provided pressure sensitive adhesive film materials suitable for use as an alternative to PVC adhesive tapes in numerous applications, with less fogging, better recyclability, and good performance characteristics meeting the requirements of those use applications. Additional aspects and advantages of the present invention will be understood by those skilled in the art given the benefit of the foregoing disclosure and the following more detailed description of certain preferred embodiments.

BRIEF DESCRIPTION OF THE DRAWINGS

Certain preferred embodiments of the invention will be described below in connection with the pending drawings in which.

Figure 1:
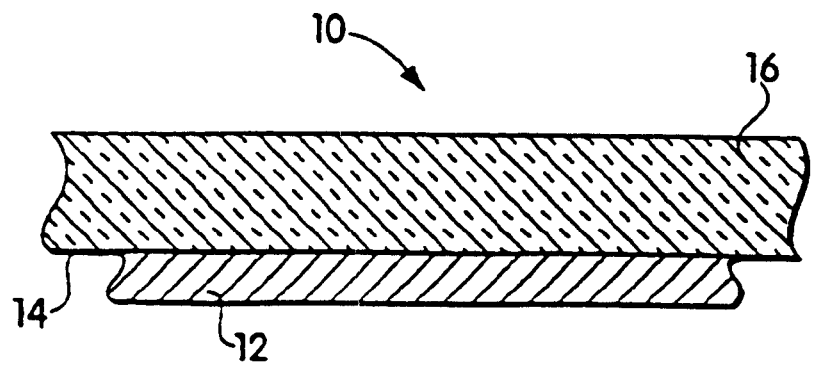
FIG. 1 is a schematic cross-sectional view of a PSA harness tape in accordance with a first preferred embodiment of the invention.

It should be understood that the appended drawings are not necessarily to scale, presenting a somewhat simplified representation of the basic features of the invention. The specific dimensions of a PSA film material in accordance with the invention will be determined in large part by the particular intended application and use environment. Certain features of the illustrated embodiments have been enlarged or distorted relative to other to facilitate visualization and clear understanding. All references to direction and position, unless otherwise indicated, refer to the orientation of the harness tape illustrated in the drawings.

DETAILED DESCRIPTION OF CERTAIN PREFERRED EMBODIMENTS

Figure 2:
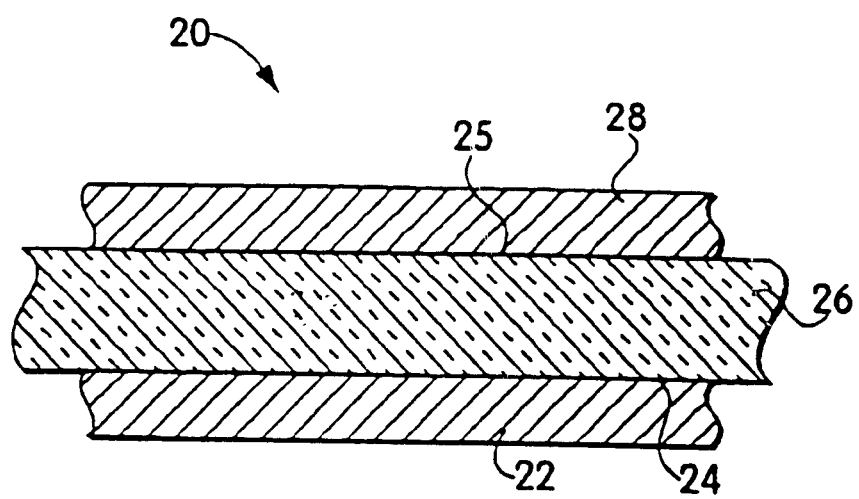
FIG. 2 is a schematic cross-sectional view of a PSA harness tape in accordance with a second preferred embodiment.

It will be apparent to those skilled in the art, that many uses and design variations are possible for the improved PSA film materials disclosed here. The following detailed discussion of various alternative and preferred features and embodiments will illustrate the general principals of the invention with reference to use of the invention as harness tape, that is, PSA tape adapted for use as wire binding tape in the construction of a wire harness. Other embodiments and uses will be apparent to those skilled in the art given the benefit of this disclosure. Referring now to the drawings, FIG. 1 shows harness tape 10 comprising a layer 12 of pressure sensitive adhesive on a first surface 14 of a plastic film 16. The formulations of the adhesive and plastic film are as disclosed above, and will be further described below. FIG. 2 illustrates an alternative embodiment, specifically, harness tape 20 comprising a layer 22 of pressure sensitive adhesive on surface 24 of extruded plastic film 26. Plastic barrier layer 28 is coextruded at opposite surface 25 of plastic film 26. Here, again, the formulation and performance characteristics of the individual layers and constituent parts thereof are discussed in more detail below.

The improved fogging characteristics of the harness tape disclosed here can be quantified, for example, using SAE J1756-94. That testing method provides a Fogging Number for a PSA tape or other film material. All references herein to a Fogging Number, unless otherwise expressly recited, are intended to mean the value calculated in accordance with such test method.

The preferred harness tapes, in addition to low-fogging characteristics, as described above, exhibit flexural stiffness in the range of 50 to 1000 mg.cm., more preferably about 100 to 200 mg.cm. (as measured by ASTM D-1388-64), tensile strength in the range of about 10 to 40, preferably 15 to 30 lbs/inch width (as measured by ASTM D-1000) and adhesion to backing and polished steel of about 15 to 60 ounces/inch, preferably 25 to 50 ounces/inch (as measured by ASTM D-1000). The preferred harness tapes also exhibit an unwind of about 15 to 60 ounces/inch, preferably about 25 to 50 ounces/inch (ASTM D-1000, Method A). The tapes also exhibit a flame retardancy such that they are self-extinguishing (per ASTM D-1000). Certain of the preferred harness tapes are also impervious to automotive fluids such as brake fluid, transmission fluid, oil, gasoline and other liquids in a manner that the tapes do not readily deteriorate or become unglued. Fluid imperviousness is measured by Ford specification ESB-M3G-177-A.

As disclosed above, the plastic film of the harness tape comprises at least thermoplastic ethylene/styrene interpolymer in major part. As used here, reference to an ingredient being present in major part means that it is at least 35% by weight of the plastic film formulation, more preferably 45 wt. % to 85 wt. %. Suitable ethylene/styrene interpolymers are commercially known. Exemplary suitable materials are marketed by Dow Chemical Corporation (Midland, Mich., USA) under the product family name INDEX interpolymers. Information regarding INDEX interpolymers can be obtained at Dow Chemical Company's website: (http://www.dow.com/prbusiness/InsiteIndex.html). Also, substantially random interpolymers of a vinylidene aromatic monomer and/or hindered aliphatic vinylidene monomer with at least one aliphatic alpha-olefin, including ethylene/styrene interpolymers suitable for use in the present invention, and suitable methods, equipment and materials (i.e., reactants, solvents, etc), are disclosed in international publication number WO 98/10014 published under the Patent Cooperation Treaty based on international application number PCT/US96/14233 by the Dow Chemical Company, the entire contents of which are incorporated herein by reference. The ethylene/styrene interpolymers and their preparation are also disclosed in International Publication number WO 98/10015 based on Patent Cooperation Treaty application number PCT/US97/15533 by the Dow Chemical Company, and in International Publication number WO 99/00449 based on Patent Cooperation Treaty application number PCT/US98/12177 by the Dow Chemical Company, the entire contents of both of which are incorporated herein by reference. It will be within the ability of those skilled in the art to select suitable ethylene/styrene interpolymer in view of such commercialization and publication, as well as in view of the present disclosure. In particular, it will be within the ability of those skilled in the art, given such commercialization and publication, and given present disclosure, to select ethylene/styrene interpolymers which have relatively high ethylene content or relatively high styrene content. The lower styrene content interpolymers provide increased flexibility, abrasion resistance, toughness and creep resistance, whereas the high styrene content interpolymers have enhanced stress relax characteristics and provide increased dead fold and sound management. It will be within the ability of those skilled in the art to identify, or to prepare without undue experimentation, alternative suitable ethylene/styrene interpolymers for use in the present invention.

The plastic film of the harness tape, as disclosed above, is formulated to further include a temperature/tensile modifier polymer for increasing the thermal resistance of the plastic film. Suitable temperature/tensile modifier polymers include, for example, thermoplastic polyolefin which is highly preferred. Most preferably, the temperature modifier polymer is one or more thermoplastic polyolefins selected from polypropylene-modified rubber, low density polyethylene, high density polyethylene, and polypropylene. Other suitable polymers will be apparent to those skilled in the art, given the benefit of this disclosure. Preferably, the harness tape has a temperature rating of at least 85° C. for meeting the service temperature requirements of motor vehicle passenger compartment wiring harness applications. Alternative preferred embodiments preferably have a temperature rating of at least 105° C. for meeting motor vehicle engine compartment service temperatures. Long term heat aging is measured by Ford ES-XU5T-1A303-AA, section 6.1 and 6.3. Suitable temperature/tensile modifier polymers are commercially available, including, for example, Adflex KS359P available from Montell Polyolefins, Wilmington, Del., and Wide Spec High Density Polyethylene LX199 available from USI Chemical Co. It will be within the ability of those skilled in the art, given the benefit of this disclosure, to use additional or alternative temperature modifier polymers in the plastic film of the harness tapes and like materials disclosed here.

Various additives can be used in the plastic film. Preferably, of course, such additives contribute no halogenated polymers and no plasticizer to the plastic film. As disclosed above, the preferred embodiments of the present invention include no halogenated plastic film polymers for recyclability, and are plasticizer-free for low-fogging. Suitable and desirable additives include a heat stabilizer for improved extrusion processability of the plastic film. Suitable heat stabilizers for improved extrusion are commercially available and known to those skilled in the art, and will be readily apparent given the benefit of the present disclosure. A flame retardant may advantageously be incorporated into the plastic film, or a flame retardant package. Suitable flame retardants and flame retardant packages are commercially available and will be apparent to those skilled in the art given the benefit of this disclosure. Exemplary suitable flame retardant materials include, for example, Decabromodiphenyl oxide, such as DE830R available Great Lakes Chemical Corp, antimony oxide, such as Grade TMS available from Great Lakes Chemical Co., and FR 11371 available from Ampacet. It will be within the ability of those skilled in the art, given the present disclosure, to use additional or alternative flame retardant materials suitable for a particular embodiment of the harness tapes and like materials disclosed here. Filler(s) may advantageously be incorporated into the plastic film. Suitable fillers are commercially available, and their use in the present invention will be apparent to those skilled in the art given the benefit of this disclosure. Exemplary suitable fillers include, for example: No. 9 NCS Calcium Carbonate available from Georgia Marble Chemical Co., McNamee Clay (Hydrated Aluminum Silicate) available from Vanderbilt, U.S., and White Knight 100 Calcium Hydroxide available from Rebase Products, Inc., Ontario, Canada. It will be within the ability of those skilled in the art, given the present disclosure, to use additional or alternative filler(s) suitable for a given embodiment of the harness tapes and like materials disclosed here. Colorant additives may advantageously be incorporated into the plastic film to provide color coding, UV protection, etc. Suitable colorants are commercially available and will be apparent to those skilled in the art given the benefit of this disclosure. Exemplary suitable colorant materials include, for example: Black Concentrate CM 92049 available from Equistar, Cincinnati, Ohio, and Red Concentrate MB 15250 available from Ampacet. It will be within the ability of those skilled in the art, given the benefit of this disclosure, to use additional or alternative colorant(s) suitable for a given embodiment of the harness tapes disclosed here.

As disclosed above, suitable pressure sensitive adhesives for harness tape applications and the like are compatible with plastic film formulated in the manner disclosed here. Preferred adhesives include water-based acrylic adhesives, suitable versions of which are commercially available and will be apparent to those skilled in the art given the benefit of this disclosure. Exemplary water-based acrylic adhesives include, for example, Latex Acrylic JB 720 available from S. C. Johnson Polymer, Sturtevant, Wis., and Acronal V210 available from BASF, Parsippany, N.J. Alternative preferred adhesives include isoprene-based, natural rubber-based and/or butyl-based adhesives, e.g., as disclosed in U.S. Pat. No. 5,681,654, the entire disclosure of which is hereby incorporated herein by reference. Such rubber-based adhesives may also be referred to as shear coated -rubber-based adhesives. Preferably the shear coated rubber-based adhesives contain substantially no styrene components; rubber-based adhesives containing SBR are found to be more likely to cause a harness tape roll to block. It will be within the ability of those skilled in the art to use suitable pressure sensitive adhesive that is compatible with the plastic film, yields the desired level of adhesion and remains functional, not causing the tape to block, within the processing limitations within the film. Reference here to the adhesives being compatible with the plastic film, in addition to the functional and performance characteristics expressly mentioned immediately above, include good anchoring of the adhesive layer to the surface of the plastic film. It will be within the ability of those skilled in the art, given the benefit of the present disclosure, to use alternative or additional adhesive materials in the harness tapes disclosed here. It also will be apparent, given the present disclosure, that the adhesive preferably contributes no plasticizer or the like to the harness tapes, so as to preserve the low-fogging and good recyclability of the harness tape.

As mentioned above, certain adhesives suitable for use in the harness tapes disclosed here can be prepared by combining the various constituent ingredients in a high shear mixer. Typically, such as for the isoprene-based adhesives of the above-mentioned Mamish et al U.S. Pat. No. 5,681,654, elastomer and cure system of the adhesive are introduced into the mixer and masticated, which softens the elastomer so that other constituents may be introduced and homogenized. This generally initiates curing. The remaining constituents are introduced as mixing continues. Following mixing, the composition is milled with at least a portion of its eventual tackifier content being added. The adhesive can then be removed from the rollers and is ready for use. Typically, the adhesive can be applied to the plastic film of the harness tape on a two-roll calendar nip. The gap of the nip is selected to provide an adhesive layer of desired thickness, e.g., 1 to 2 mils. The adhesive entering the rollers is pressed against the plastic film. Further discussion of tape manufacture is provided in U.S. Pat. No. 4,992,331 which is incorporated herein by reference.

The plastic film of the harness tape disclosed here preferably is formed by extrusion with a minimum of machine direction orientation. Alternatively, the plastic film can be formed as a differentially calendared film. Alternative methods for producing the plastic film will be apparent to those skilled in the art given the benefit of the present disclosure. In addition, alternative methods of applying the adhesive layer to the plastic film will be apparent to those skilled in the art given the benefit of this disclosure. As noted above, the harness tapes disclosed here can be formed using commercially available and well-known production equipment and methods. This applies not only to the production of the plastic film and the adhesive, and the coating of the adhesive on to the plastic film, but also to forming the harness tape in standard rolls for application by hand or machine in the construction of wiring harnesses. For embodiments in accordance with FIG. 2, preferably the plastic film is extruded and the plastic barrier layer is coextruded with the plastic film. Whereas the plastic film preferably is about 4 to 6 mil thick, more preferably 4 to 4 mil thick, the plastic barrier layer preferably is only about 0.25 to 0.50 mil thick, so as not to unduly interfere with the cross rip properties of the filler. The coextruded plastic barrier layer can serve various functions in the harness tape. Notably, it can aid in avoiding blocking of the tape rolls. Also, in the finished wiring harness, it can provide improved abrasion resistance and fluid resistance, if applicable. Suitable materials for the plastic barrier layer include low density polyethylene (LDPE), linear LDPE (LLDPE), polypropylene, high density polyethylene (HDPE), lower styrene content ethylene/styrene interpolymers, etc., or a mixture of any of them. LDPE is widely commercially available and it will be within the ability of those skilled in the art, given the benefit of this disclosure, to use suitable LDPE for a given harness tape application. Optionally, the plastic barrier layer further comprises additives, such as flame retardant, colorant, filler, heat stabilizer, etc. Suitable examples of these materials, in general, include those discussed above in connection with the plastic layer. Alternative and additional additives will be apparent to those skilled in the art given the benefit of this disclosure.

In accordance with certain preferred embodiments, the pressure sensitive adhesive sheet material disclosed here further comprises a carrier web. Suitable carrier webs include, for example, woven and non-woven materials. Suitable woven materials include, for example, woven cloth including, for example, cotton/polyester blend cloth. Other suitable carrier webs include, for example, non woven fabrics, such as non woven fabrics of synthetic polymer fibers. Alternative suitable carrier webs will be readily apparent to those skilled in the art in view of the present disclosure.

Preferably, the carrier web is joined to the plastic film by laminating or other suitable technique. In accordance with preferred manufacturing techniques, the plastic film is extruded and a carrier web is bonded to the plastic film as it exits the extruder die. Optionally, an adhesive can be used to join the carrier web to the plastic film. It will be within the ability of those skilled in the art to select carrier web materials which are suitable, together with the other components of the PSA tape or other adhesive sheet material of the invention, for an intended end use application. Thus, for example, the tape or other sheet materials in accordance with the present disclosure, incorporating such carrier web, provides laterally-across straight edge tear by hand and other properties appropriate for harness tape applications and the like.

Test Procedures

The fogging characteristics of the harness tape can be tested using SAE J1756-94, entitled "Interior Trim-Fogging Characteristics" Feb. 6, 1989. The method of this publication is incorporated herein by reference. The Fogging Numbers reported herein are accurate to at least about plus-or-minus 10%.

Test methods for other properties, such as flexural rigidity, tensile strength, adhesion, unwind, and flame retardancy and fluid resistance are given in the procedures recited above.

EXAMPLE 1

A harness tape in accordance with a preferred embodiment of the invention was prepared, suitable for commercial harness tape applications in the passenger compartment of motor vehicles. The harness tape has a plasticizer-free, chlorine-free formulated plastic film with a compatible adhesive.

The following constituents were formulated into a plasticizer-free, chlorine-free plastic film for the harness tape. All percent numbers are based on the complete formulation of the plastic film, including all plastic film polymers, additives and any other ingredients. The thermoplastic interpolymer of ethylene and styrene monomers listed in the formulation below was a metallocene polyolefin having a styrene content of 69%, and specific gravity of about 0.9 to 1.2. The thermoplastic polypropylene-modified rubber listed in the formulation below was Adflex KS359P, obtained from Montell Polyolefins, Wilmington, Del., and functioned as a temperature modifier polymer in the plastic film to improve the heat aging performance of the harness tape as well as preserving the conformability. The calcium carbonate concentrate was SH3 (an experimental concentrate obtained from Dow Chemical Company, Midland Mich.), and functioned as a filler in the harness tape. The black concentrate was CM 90249 obtained from Equistar, Cincinnati, Ohio, , and functioned as a colorant in the harness tape. The decabromodiphenyl oxide was DE83-R obtained from Great Lakes Chemical Co., and the antimony oxide was Grade TMS obtained from Great Lakes Chemical Co., which functioned as flame retardants to render the harness tape self-extinguishing (per ASTM D-1000).

PLASTIC FILM

| Constituent | (weight %) |
| --- | --- |
| Plastic Film Polymers | |
| thermoplastic interpolymer of ethylene and styrene monomers | 49.95 |
| thermoplastic polypropylene-modified rubber | 11.89 |
| Other Film Ingredients | |
| CaCO3 concentrate, SH3 | 18.80 |
| Black Concentrate, CM 92049 | 3.00 |
| Antimony Oxide, Grade TMS | 5.45 |
| Decabromodiphenyl oxide, DE83-R | 10.91 |

The above listed ingredients of the plastic film of the harness tape were mixed and extruded into a film about 3 to 5 mils thick, using commercially available film extrusion equipment and techniques. Specifically, all of the above ingredients were compounded in an oil heated chrome mill at 350° F., sheeted out, cooled and granulated. The granulated material was fed into a Davis Standard DS 200 single screw extruder equipped with a 24:1 polyolefin standard compression screw. Extruder barrel temperature zones were 330°, 370°, and 410° F. Extruder pipe and flange temperatures were 410° F. The film die and adapter zones were 420° F. The film that exited the 16 inch wide film die was solidified in a two roll casting station at a line speed of about 25 fpm. The film was then edge trimmed and corona treated to a surface energy level of 42–44 dyne/cm$^2$.

Plasticizer-free, alogen-free adhesive for the harness tape of this was applied to the above backing. Specifically, S. C. Johnson JB720 latex acrylic adhesive was applied as it was received from the manufacturer using a pilot scale coating line with three forced convection oven zones. The adhesive was coating onto the film using a reverse roll coating head configuration. The zone temperatures were 150°, 180° and 200° F. The line speed was 4 fpm. The adhesive coated film was wound with a protective low density polyethylene, general purpose, single sided release coated liner. This master roll was converted into 0.75 inch wide tape rolls by removing the liner and logging the adhesive coated film onto 1.5 inch diameter cores. The logs were then converted into tape rolls using a Javelin single knife, manually indexed lathe slitter.

In addition to its excellent Fogging Number, which was above about 95, the harness tape prepared in accordance with this example showed excellent performance characteristics and other properties. Because its base polymers are substantially halogen-free, it is more readily recyclable than harness tapes formed of PVC plastic film. It had conformability suitable for commercial harness tape applications, with good dead fold and stress relaxation properties. It exhibited laterally-across straight edge tear by hand, requiring appropriate tear force for tearing by hand. In addition, it was flame retardant sufficiently to be self-extinguishing (per ASTM D-1000). Also, it had good temperature stability, showing long term heat aging per Ford ES-XU5T-1A303-AA, section 6.1 and 6.3) of at least 3000 hr at 85° C., and good adhesion to steel (per ASTM D-1000) of 15 to 20 ounces/inch. When rolled, it did not exhibit blocking after one month at 120° F. and had good unwind force (per ASTM D-1000 Method A) of about 60 ounces/inch without significant ratcheting.

EXAMPLE 2

A harness tape in accordance with another preferred embodiment of the invention was prepared. In this example the harness tape has a plasticizer-free, halogen-free plastic barrier layer coextruded with the plastic film, along with a compatible adhesive suitable for commercial harness tape applications in the passenger compartment of motor vehicles.

The following constituents were formulated into a plasticizer-free, chlorine-free plastic film for the harness tape. All percent numbers are based on the complete formulation of the plastic film, including all plastic film polymers, additives and any other ingredients. The thermoplastic interpolymer of ethylene and styrene monomers listed in the formulation below was a metallocene polyolefin having a styrene content of 69%, and specific gravity of 1.0. The thermoplastic polypropylene-modified rubber listed in the formulation below was Adflex KS359P obtained from Montell Polyolefins, Wilmington, Del., and functioned as a temperature/tensile modifier polymer in the plastic film to improve the heat aging performance of the harness tape as well as preserving the conformability. The black concentrate was CM 90249 obtained from Equistar, Cincinnati, Ohio, and functioned as a colorant in the harness tape. The FR 11371, from Ampacet, functioned as a flame retardant to render the harness tape self-extinguishing (per ASTM D-1000).

PLASTIC FILM

| Constituent | Composition (%) |
| --- | --- |
| Plastic Film Polymers | |
| thermoplastic interpolymer of ethylene and styrene monomers | 62 |
| thermoplastic polypropylene-modified rubber | 15 |
| Other Film Ingredients | |
| Black Concentrate, CM 92049 | 3.0 |
| FR 11371 | 20 |

The following constituents were formulated into a plasticizer-free, chlorine-free plastic barrier layer for the harness tape. All percent numbers are based on the complete formulation of the plastic barrier layer, including all polymers, additives and any other ingredients. The LDPE listed in the formulation below was WSLDPE NA 096, obtained from Quantum, U. S. I. The FR 11371 listed in the barrier layer formulation below was obtained from Ampacet, and functioned as a flame retardant in the plastic barrier layer to render the harness tape self-extinguishing (per ASTM D-1000). The black concentrate CM 90249 was obtained from Equistar, Cincinnati, Ohio functioned as a colorant in the plastic barrier layer.

PLASTIC BARRIER LAYER

| Constituent | Composition (wt. %) |
| --- | --- |
| Plastic Barrier Layer Polymers | |
| WSLDPE | 77 |
| Other Film Ingredients | |
| Black Concentrate, CM 92049 | 3.0 |
| FR 11371 | 20 |

The above listed ingredients of the plastic barrier layer of the harness tape were combined and extruded into a film about 0.25 to 0.5 mil thick. Specifically, it was coextruded with the above described plastic film of the harness tape using commercially available film production equipment and techniques. More specifically, all of the above ingredients for each of the layers were dry blended. Each of the two blends then was fed into its own Davis Standard DS 200 single screw extruder (one for each layer) equipped with 24:1 polyolefin standard compression screws. Extruder barrel temperature zones for both extruders were 330°, 370°, and 410° F. Extruder pipe and flange temperatures were also 410° F. The coextrusion film die and adapter zones were 420° F. The film that exited the 16 inch wide film die was solidified in a two roll casting station at a line speed of about 25 fpm. The film was then edge trimmed.

The following constituents were formulated into a plasticizer-free, chlorine-free adhesive for the harness tape of this example. All phr numbers are based on the complete formulation of the adhesive, including all elastomer, additives and any other ingredients.

ADHESIVE

| Constituent | PHR |
| --- | --- |
| Natural Rubber (Sir 10) | 75.0 |
| Low Density Polyethylene (1018 LDPE) | 18.7 |
| Reclaimed Butyl (High Mooney Butex) | 6.3 |
| Methyl Tuads | 0.3 |
| Ethylene-propylene Copolymer (Vistalon 404) | 2.2 |
| Low Molecular Weight Polybutene (H100) | 0.5 |
| Zinc 2-mercaptobenzothiazole (Zetax) | 1.0 |
| Antioxidant (Irganox 1010) | 1.0 |
| Antimony Oxide (TMS-Anzon) | 15.0 |
| Decabromodiphenyl oxide (DE-83) | 30.0 |
| McNamee Clay | 35.0 |
| Hydrocarbon Resin (Escorez 1315) | 65.3 |

The constituents of the adhesive were combined in a Banbury mixer in accordance with known techniques, as set forth, for example, in U.S. Pat. No. 5,681,654, incorporated herein by reference, above. The elastomer and cure system masticated for about 50 to 60 seconds. It is believed that the frictional forces generated in the mixer heats the mixture to about 250 degrees F. A second charge was introduced that includes the antioxidant, 50% of the flame retardant, 50% of the filler, and 30% of the tackifier. The mixing continued for about 1 to 1.5 minutes after the second charge is added. A third charge containing the remaining portion of filler, antioxidant, and flame retardant was then added and mixing continued for another 1 to 2 minutes.

Following mixing, the composition was milled on a two roller milling apparatus. The remaining portion (30%) of tackifier was added in the milling step. The rollers were heated to about 200° F. and the milling continued for about 20 minutes. The adhesive was removed from the rollers and incorporated into the harness tape. Specifically, the adhesive was applied to the plastic film on a two-roll calendar nip. The adhesive was coated onto the plastic film layer. The plastic film layer required no surface treatment and could serve as the tie layer for the adhesive. The gap of the nip is selected to provide an adhesive layer of desired thickness, here about 1.5 mils. Further discussion of tape manufacture is provided in U.S. Pat. No. 4,992,331, which is incorporated herein by reference.

In addition to its excellent Fogging Number, the harness tape prepared in accordance with this example showed excellent performance characteristics and other properties. Because it contains base polymers which are substantially halogen-free, it is more readily recyclable than harness tapes formed of PVC plastic film. It had conformability suitable for commercial harness tape applications, with good dead fold and stress relaxation properties. It exhibited laterally-across straight edge tear by hand. In addition, it was flame retardant sufficiently to be self-extinguishing per ASTM D-1000) and impervious to automotive fluids (per Ford specification ESB-M3G-177-A). Also, it had-good temperature stability, showing long term heat aging per Ford ES-XU5T-Ia303-AA, sections 6.1 and 6.3 of at least 3000 hours at 85° C., and good adhesion to steel (per ASTM D-1000) of at least 25 to 40 ounces/inch.

What is claimed is:

1. Flexible, conformable PSA film material comprising, in combination:

a flexible, conformable plastic film formulated of plastic film polymers and optionally comprising additives, the plastic film polymers comprising at least thermoplastic ethylene/styrene interpolymer in major part and a temperature modifier polymer which increases the thermal resistance of the plastic film; and a pressure sensitive adhesive layer on at least a first surface of the plastic film, which is compatible with the plastic film.

2. The flexible conformable, PSA film material of claim 1 having good conformability, flame retardancy sufficient to be self-extinguishing (per ASTM D-1000) and performance characteristics:

Fogging Number (per SAE J1756-94) of at least 60;

long term heat aging (per Ford ES-XU5T-1A303-AA, section 6.1 and 6.3) of at least 3000 hours at 85° C.;

unwind force (per ASTM D-1000 Method A) of from 40 to 60 ounces/inch; and adhesion to steel (per ASTM D-1000) of 15 to 65 ounces/inch.

3. The flexible conformable, PSA film material of claim 1 wherein the temperature modifier polymer comprises a thermoplastic polyolefin.

4. The flexible conformable, PSA film material of claim 3 wherein the thermoplastic polyolefin is selected from the group consisting of low density polyethylene, high density polyethylene, polypropylene, and polypropylene-modified rubber.

5. The flexible conformable, PSA film material of claim 1 wherein the flame retardant is selected from the group consisting of decabromodiphenyl oxide, antimony oxide and any combination thereof.

6. The flexible conformable, PSA film material of claim 1 wherein the plastic film further comprises filler and colorant additives.

7. The flexible conformable, PSA film material of claim 6 wherein the filler is selected from the group consisting of calcium carbonate, calcium hydroxide, clay, and any combination thereof.

8. The flexible conformable, PSA film material of claim 6 wherein the colorant is selected from the group consisting of black concentrate, red concentrate and any combination thereof.

9. The flexible conformable, PSA film material of claim 1 wherein the pressure sensitive adhesive layer comprises in major part a compound selected from the group consisting of acrylic-based adhesive, isoprene-based adhesive, natural rubber-based adhesive, butyl-based adhesive and a mixture thereof.

10. The flexible conformable, PSA film material of claim 1 wherein the pressure sensitive adhesive layer comprises acrylic based adhesive.

11. The flexible conformable, PSA film material of claim 1 wherein the plastic film polymers and the pressure sensitive adhesive layer are substantially halogen-free.

12. The flexible conformable, PSA film material of claim 1 wherein the plastic film is extruded film, further comprising a plastic barrier layer coextruded with the plastic film on a second surface of the plastic film opposite a first surface of the plastic film.

13. The flexible conformable, PSA film material of claim 12 wherein the plastic barrier layer is formulated of plastic film polymers and optionally further comprises additives, the plastic film comprising in major part a compound selected from the group consisting of LDPE, PP, HDPE, LLDPE, ethylene/styrene interpolymer, and any mixture thereof.

14. The flexible conformable, PSA film material of claim 13 wherein the plastic barrier layer comprises flame retardant additive.

15. The flexible conformable, PSA film material of claim 13 wherein the plastic barrier layer comprises colorant.

16. Harness tape which is substantially halogen free and has a laterally across straight edge tear by hand, comprising, in combination:

a plasticizer-free plastic film formulated of plastic film polymers and optionally comprising additives, the plastic film polymers comprising at least thermoplastic ethylene/styrene interpolymer in major part and a temperature modifier polymer which increases the thermal resistance of the plastic film; and a pressure sensitive adhesive layer on at least a first surface of the plastic film;

said harness tape having good conformability and being flame retardant sufficient to be self-extinguishing (per ASTM D-1000), with performance characteristics:

Fogging Number (per SAE J1756-94) of at least 60;

long term heat aging (per Ford Es-XU5T-1A303-AA, section 6.1 and 6.3) of at least 3000 hours at 85° C.;

unwind force (per ASTM D-1000 Method A) of from 40 to 60 ounces/inch; and adhesion to steel (per ASTM D-1000) of 15 to 20 ounces/inch.

17. Harness tape of claim 16 wherein the plastic film is an extruded film and the harness tape further comprises a plastic barrier layer coextruded with the plastic film at a second surface of the plastic film opposite the first surface of the plastic film, the plastic film barrier layer comprising in major part a compound selected from the group consisting of LDPE, HDPE, PP, LLDPE, ethylene/styrene interpolymer, and any mixture thereof, and flame retardant additive.

18. Flexible, conformable PSA film material comprising, in combination:

a carrier web;

a plastic film integral with the carrier web formulated of plastic film polymers and optionally comprising additives, the plastic film polymers comprising at least thermoplastic ethylene/styrene interpolymer in major part and a temperature modifier polymer which increases the thermal resistance of the plastic film; and a pressure sensitive adhesive layer on at least a first surface of the plastic film, which is compatible with the plastic film.

19. The flexible conformable, PSA film material of claim 18 wherein the carrier web is laminated to the plastic film.

20. The flexible conformable, PSA film material of claim 18 wherein the carrier web is woven cloth.

21. The flexible conformable, PSA film material of claim 20 wherein the woven cloth is cotton polyester blend cloth.

22. The flexible conformable, PSA film material of claim 18 wherein the carrier web is nonwoven fabric.

* * * * *